United States Patent [19]

Ezaki

[11] Patent Number: 5,416,598

[45] Date of Patent: May 16, 1995

[54] COMBINED IMAGE PICKUP AND SIGNAL RECORDER FOR VIDEO SIGNALS DERIVED FROM IMAGES HAVING DIFFERENT ASPECT RATIOS

[75] Inventor: Tadashi Ezaki, Kanagawa, Japan

[73] Assignee: Sony Corporation, Tokyo, Japan

[21] Appl. No.: 733,111

[22] Filed: Jul. 19, 1991

[30] Foreign Application Priority Data

Jul. 31, 1990 [JP] Japan .................. 2-202703

[51] Int. Cl.$^6$ ........................................... H04N 5/225
[52] U.S. Cl. ............................ 358/310; 358/335;
  358/906; 360/27; 360/33.1; 348/207; 348/434
[58] Field of Search ............... 358/310, 319, 320, 321,
  358/330, 906, 335, 337, 338, 141, 140, 142, 11,
  12, 21 R; 360/9.1, 27, 29, 30, 33.1; H04N 9/79,
  5/76, 5/782, 5/91, 5/92; 348/207, 340, 441,
  434, 445, 239, 230

[56] References Cited

U.S. PATENT DOCUMENTS

| | | | |
|---|---|---|---|
| 4,647,983 | 3/1987 | Ota | 358/310 |
| 4,734,772 | 3/1988 | Akiyama | 348/340 |
| 4,743,978 | 5/1988 | Tanaka | 358/310 |
| 4,862,292 | 8/1989 | Enari et al. | 358/335 |
| 4,890,165 | 12/1989 | Hasegawa | 358/310 |
| 4,897,722 | 1/1990 | Flory | 348/434 |
| 4,963,991 | 10/1990 | Honjo | 358/310 |
| 5,121,266 | 6/1992 | Ito et al. | 360/33.1 |
| 5,122,885 | 6/1992 | Yoshioka et al. | 358/335 |
| 5,132,793 | 7/1992 | Hirahata et al. | 358/141 |
| 5,159,438 | 10/1992 | Rabii | 358/12 |
| 5,159,461 | 10/1992 | Fujimoto | 358/906 |
| 5,307,171 | 4/1994 | Azuma et al. | 358/335 |

FOREIGN PATENT DOCUMENTS

| | | |
|---|---|---|
| 0293992 | 12/1988 | European Pat. Off. . |
| 0307808 | 3/1989 | European Pat. Off. . |
| 0372555 | 6/1990 | European Pat. Off. . |
| 0376675 | 7/1990 | European Pat. Off. . |
| 0411440A2 | 2/1991 | European Pat. Off. . |
| 0414993A2 | 3/1991 | European Pat. Off. . |
| 3917576 | 5/1988 | Germany . |
| 2049374 | 5/1979 | United Kingdom . |
| WO89/12372 | 12/1989 | WIPO . |

OTHER PUBLICATIONS

IEEE Transactions on Consumer Electronics, vo. 35, No. 3, 30 Aug. 1989, New York US pp. 202–206; Y. nagaoka et al. 'A two-channel recording VCR using orthogonal arrangement of heads'.

Patent Abstracts of Japan, vol. 13, No. 333 (E-794) 26 Jul. 1989 & JP-A-01 097 079 (Canon Inc) 14 Apr. 1989.

Primary Examiner—Tommy P. Chin
Assistant Examiner—Khoi Truong
Attorney, Agent, or Firm—William S. Frommer; Alvin Sinderbrand

[57] ABSTRACT

An apparatus for producing and recording a video signal, which comprises a signal supplying device for picking up images in a picture area having a first or second aspect ratio to supply a first pickup output signal representing images in the picture area with the first aspect ratio or a second pickup output signal representing images in the picture area with the second aspect ratio. The pickup output signal is supplied to a signal processing circuit having a first condition for processing the first pickup output signal to produce a first video signal therefrom or a second condition for processing the second pickup output signal to produce a second video signal; whereafter the first or second video signal produced by the signal processing circuit is recorded on a recording medium. An operation control device controls the signal supplying device to supply the first pickup output signal while disposing the signal processing circuit in its first condition or controls the signal supplying device to supply the second pickup output signal while disposing the signal processing circuit in its second condition.

8 Claims, 8 Drawing Sheets

COMBINED IMAGE PICKUP AND SIGNAL RECORDER FOR VIDEO SIGNALS DERIVED FROM IMAGES HAVING DIFFERENT ASPECT RATIOS

FIELD OF THE INVENTION

The present invention generally relates to apparatus for producing and recording video signals, and more particularly, to such apparatus which produces a video signal from a pickup output signal generated by an image pickup device that is incorporated therewith then records that video signal on a recording medium.

DESCRIPTION OF THE PRIOR ART

There have been previously proposed various television systems in which the aspect ratio of the reproduced television picture is 3:4. In a television system having a 3:4 aspect ratio, a video camera picks up images of subjects in a picture area that also has an aspect ratio of 3:4, and produces a video signal from the pickup output signal representing those images. Video signal recording apparatus, such as a video tape recorder, produces and records this video signal on a magnetic tape from which a reproduced picture having an aspect ratio of 3:4 (hereinafter, referred to as a video signal of the 3:4 aspect ratio) may be obtained.

Figure 1:
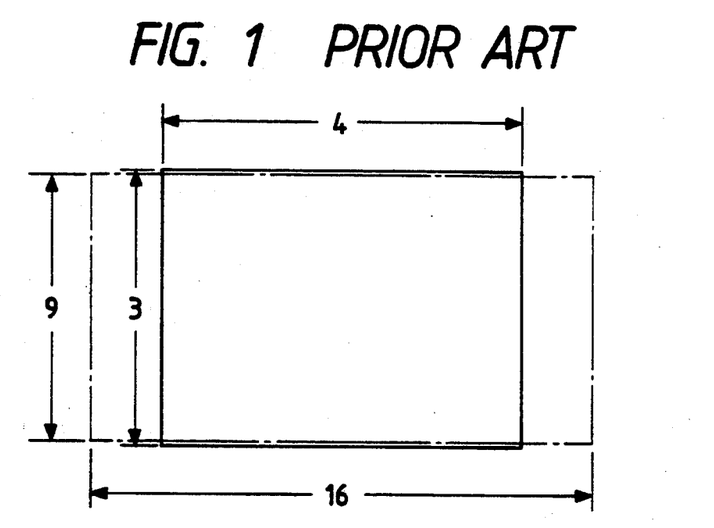
FIG. 1 is a schematic representation of aspect ratios of reproduced television pictures.

As a result of diverse uses of pictures reproduced from television signals, there has been also proposed another television system in which the picture has an aspect ratio of 9:16. FIG. 1. illustrates in solid line a picture with an aspect ratio of 3:4 and, in dot-dash line a picture with an aspect ratio of 9:16 which is wider in the horizontal direction as compared to the picture of aspect ratio 3:4. A video signal from which a the picture of aspect ratio 3:4. A video signal from which a picture of the aspect ratio of 9:16 is reproduced (hereinafter, referred to as a video signal of the 9:16 aspect ratio) is produced by a video camera which picks up images of subjects in a picture area that has an aspect ratio of 9:16 and produces the video signal from the pickup output signal representing those images. The video signal of the 9:16 aspect ratio is provided with increased information in the horizontal direction and increased high frequency components as compared to the video signal of the 3:4 aspect ratio. Hence, the video signal of the 9:16 aspect ratio occupies a larger frequency bandwidth. The reproduced picture having the aspect ratio of 9:16 has a horizontal resolution of, for example, 400 lines.

It is desired to provide a video camera which can be used for picking up images of subjects in a picture area having the aspect ratio of 3:4 and produce a signal therefrom, as well as for picking up images of subjects in a picture area having the aspect ratio of 9:16 and produce a video signal therefrom, as may be selected by a user.

A video signal of the 9:16 aspect ratio, may be recorded by a video tape recorder on magnetic tape. Since the video signal of the 9:16 aspect ratio is provided with increased information in the horizontal direction and increased high frequency components so as to occupy a larger frequency bandwidth as compared to the video signal of the 3:4 aspect ratio, if the video tape recorder which operates properly to record the video signal of the 3:4 aspect ratio also is used to record the video signal of the 9:16 aspect ratio, the usual operating characteristics of the recorder limits the higher frequencies of the video signal of the 9:16 aspect ratio and therefore a reproduced picture derived from the video signal of the 9:16 aspect ratio that had been so recorded exhibits reduced horizontal resolution. Accordingly, it is desired to provide a video tape recorder which can accurately record a video signal of the 3:4 aspect ratio as well as a video signal of the 9:16 aspect ratio as may be selected by a user.

It is further desired to provide a video tape recorder combined with a video camera in a single electronic apparatus, such as camcorder, which can selectively produce either a video signal of the 3:4 aspect ratio or a video signal of the 9:16 aspect ratio, and which can record either of these video signals without restraints. However, there has not heretofore been such a video tape recorder in combination with a video camera to satisfy this desire.

OBJECTS AND SUMMARY OF THE INVENTION

Accordingly, it is an object of the present invention to provide an apparatus for producing and recording video signals having different aspect ratios without deleteriously affecting higher frequency components that may be present in one video signal but not another.

Another object of the present invention is to provide an apparatus for producing and recording a video signal having either a first aspect ratio of, for example, 3:4 or a second aspect ratio of, for example, 9:16, as may be selected by a user, without frequency constraints or other restrictions.

According to the present invention, there is provided an apparatus for producing and recording video signals of selectively different aspect ratios in which images in a picture area of first or second different aspect ratios are picked up by an image pickup device that produces first or second pickup output signals representing the images in those picture areas, respectively. A signal recording device has a signal processing circuit which operates in a first condition for processing the first pickup output signal to produce a first video signal and also operates in a second condition for processing the second pickup output signal to produce a second video signal. The video signal produced by the signal processing circuit is recorded on a recording medium. An operation control device controls both the image pickup device and the signal recording device such that when the first pickup output signal is produced by the image pickup device, the signal processing circuit is disposed in its first condition and when the second pickup output signal is produced the signal processing circuit is disposed in its second condition.

In the apparatus of the present invention, the signal recording device is controlled automatically to produce from the first pickup output signal a first video signal from which a picture having a first aspect ratio of, for example, 3:4 may be reproduced, and to produce from the second pickup output signal a second video signal from which a picture having a second aspect ratio of, for example, 9:16 may be produced. Both the image pickup device and the signal recording device are under the control of a common operation control device.

Accordingly, with the apparatus of the present invention, either the first video signal (from which pictures having the first aspect ratio are reproduced) or the second video signal (from which pictures having the second aspect ratio are reproduced) is produced by respective signal processings as may be selected by a user; and the video signal thus produced is recorded on the recording medium without frequency restraints or other restrictions.

The above, and other objects, features and advantages of the present invention will be apparent from the following detailed description which is to be read in conjunction with the accompanying drawings.

DESCRIPTION OF THE PREFERRED EMBODIMENTS

Figure 2:
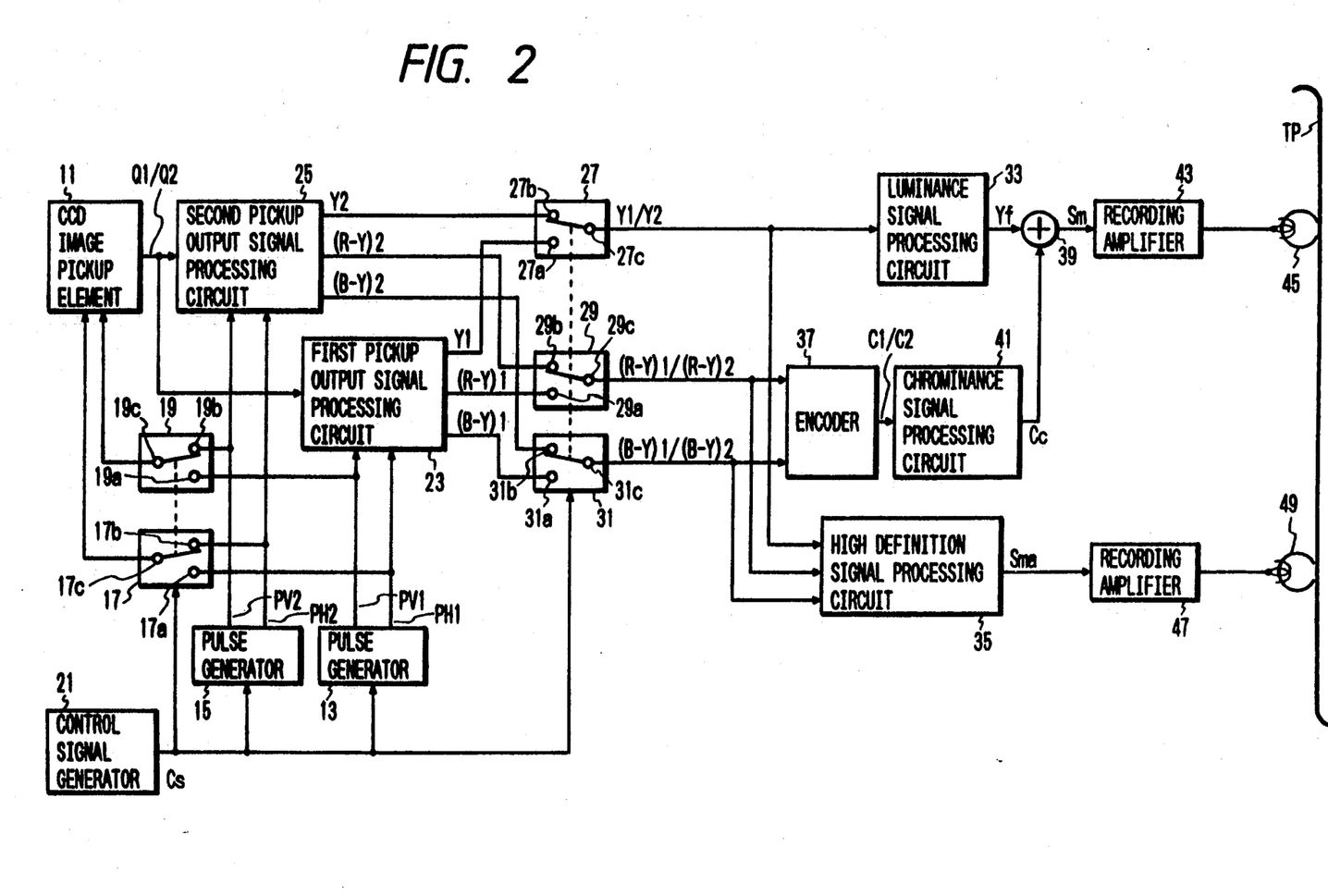
FIG. 2 is a block diagram of a first embodiment of video signal producing and recording apparatus according to the present invention.

FIG. 2 shows a first embodiment of video signal producing and recording apparatus according to the present invention.

Referring to FIG. 2, a solid state image pickup element having a charge coupled device (CCD) (hereinafter, referred to as a CCD image pickup element 11) is provided. Pulse generators 13 and 15 are provided for supplying the CCD image pickup element 11 with driving pulses. The pulse generator 13 produces a horizontal driving pulse PH1 and a vertical driving pulse PV1, and the pulse generator 15 produces a horizontal driving pulse PH2 and a vertical driving pulse PV2. The horizontal driving pulse PH1 and vertical driving pulse PV1 constitute a first pair of driving pulses used for producing a video signal of the 3:4 aspect ratio and the horizontal driving pulse PH2 and vertical driving pulse PV2 constitute a second pair of driving pulses used for producing a video signal of the 9:16 aspect ratio. The frequency of the horizontal pulse PH2 is higher than that of the horizontal driving pulse PH1, and the vertical pulses PV1 and PV2 have the same frequency.

The horizontal driving pulse PH1 from the pulse generator 13 and the horizontal driving pulse PH2 from the pulse generator 15 are supplied to respective contacts 17a and 17b of a switch 17, and one or the other horizontal driving pulse is derived selectively from the switch 17 through a movable contact 17c to be applied to the CCD image pickup element 11. The vertical driving pulse PV1 from the pulse generator 13 and the vertical driving pulse PV2 from the pulse generator 15 are supplied to respective contacts 19a and 19b of a switch 19, and one or the other vertical driving pulse is derived selectively from the switch 19 through a movable contact 19c to be applied to the CCD image pickup element 11.

The pulse generators 13 and 15 and the switches 17 and 19 are controlled by an aspect ratio changing signal Cs supplied from a control signal generator 21. When the aspect ratio changing signal exhibits a low level, as when a user selects the 3:4 aspect ratio, the pulse generator 13 is operative, the pulse generator 15 is inoperative, the movable contact 17c of the switch 17 is connected with the contact 17a and the movable contact 19c of the switch 19 is connected with the contact 19a, so that the horizontal and vertical driving pulses PH1 and PV1 from the pulse generator 13 are supplied to the CCD image pickup element 11. Consequently, the image pickup element 11 is driven to pick up images in a picture area with a first aspect ratio of 3:4 and to produce a first pickup output signal Q1 corresponding to those images. On the other hand, when the aspect ratio changing signal exhibits a high level, as when the user selects the 9:16 aspect ratio, the pulse generator 13 is inoperative, the pulse generator 15 is operative, the movable contact 17c of the switch 17 is connected with the contact 17b and the movable contact 19c of the switch 19 is connected with the contact 19b, so that the horizontal and vertical driving pulses PH2 and PV2 from the pulse generator 15 are supplied to the CCD image pickup element 11. Now, the image pickup element 11 is driven to pick up images in a picture area with a second aspect ratio of 9:16 and to produce a second pickup output signal Q2 corresponding to those images.

The first or second pickup output signals Q1 or Q2 produced by the CCD image pickup element 11 are supplied to first and second pickup output signal processing circuits 23 and 25, respectively. The first pickup output signal processing circuit 3 is also supplied with the horizontal and vertical driving pulses PH1 and PV1 from the pulse generator 13 and the second pickup output signal processing circuit 25 likewise is supplied with the horizontal and vertical driving pulses PH2 and PV2 from the pulse generator 15. The first pickup output signal processing circuit 23 subjects the first pickup output signal Q1 obtained from the CCD image pickup element 11 to conventional processing operations such as sampling, AGC, white balance, white clipping, gamma correction and aperture correction so as to produce a luminance signal Y1, a color difference signal (R−Y)1 and a color differences signal (B−Y)1. The luminance signal Y1, the color difference signal (R−Y)1, and the color difference signal (B−Y)1 collectively comprise a video signal of the 3:4 aspect ratio and are supplied to a contact 27a of a switch 27, a contact 29a of a switch 29 and a contact 31a of a switch 31, respectively. Similarly, the second pickup output signal processing circuit 25 subjects the second pickup output signal Q2 obtained from the CCD image pickup element 11 to conventional signal processing operations, such as those mentioned above so as to produce a luminance signal Y2, a color difference signal (R−Y)2 and a color difference signal (B−Y)2. The luminance signal Y2, the color difference signal (R−Y)2, and the color difference signal (B−Y)2 collectively comprise a video signal of the 9:16 aspect ratio and are supplied to a contact 27b of the switch 27, a contact 29b of the switch 29 and a contact 31b of the switch 31, respectively. This video signal of the 9:16 aspect ratio is provided with increased information in the horizontal direction and with increased high frequency components as compared to the video signal of the 3:4 aspect ratio, and thus occupies a larger frequency bandwidth.

The settings of switches 27, 29 and 31 are controlled by the aspect ratio changing signal Cs supplied from the control signal generator 21. As aforementioned, when the aspect ratio changing signal Cs exhibits a low level, the movable contact 27c of the switch 27 is connected with the contact 27a, the movable contact 29c of the switch 29 is connected with the contact 29a, and the movable contact 31c of the switch 31 is connected with the contact 31a, so that the luminance signal Y1, the color difference signal (R−Y)1, and the color difference signal (B−Y)1 are passed by the switches 27, 29 and 31, respectively. Conversely, and as mentioned above, when the aspect ratio changing signal Cs exhibits a high level, the movable contact 27c of the switch 27 is connected with the contact 27b, the movable contact 29c of the switch 29 is connected with the contact 29b, and the movable contact 31c of the switch 31 is connected with the contact 31b, so that the luminance signal Y2, the color difference signal (R−Y)2 and the color difference signal (B−Y)2 are passed by switches 27, 29 and 31, respectively.

The luminance signal Y1 or Y2 passed by the switch 27 is supplied to a luminance signal processing circuit 33 and also to a high definition signal processing circuit 35. The color difference signal (R−Y)1 or (R−Y)2 passed by the switch 29 and the color difference signal (B−Y)1 or (B−Y)2 passed by the switch 31 are supplied to an encoder 37 and also to the high definition signal processing circuit 35.

Assuming that the aspect ratio changing signal Cs from the control signal generator 21 exhibits its low level and therefore the luminance signal Y1, the color difference signal (R−Y)1 and the color difference signal (B−Y)1 are passed by switches 27, 29 and 31, respectively, a frequency-modulated luminance signal (hereinafter, referred to as an FM luminance signal) Yf which is produced by the luminance signal processing circuit 33 from the luminance signal Y1 is supplied to a signal mixing circuit 39. Additionally, a chrominance signal C1 is produced by the encoder 37 from the color difference signals (R−Y)1 and (B−Y)1 and is supplied to a chrominance signal processing circuit 41 whereat it is down-converted by frequency-converting the chrominance signal C1 into a lower frequency band. This frequency converted chrominance signal Cs is supplied to the signal mixing circuit 39.

Figure 3:
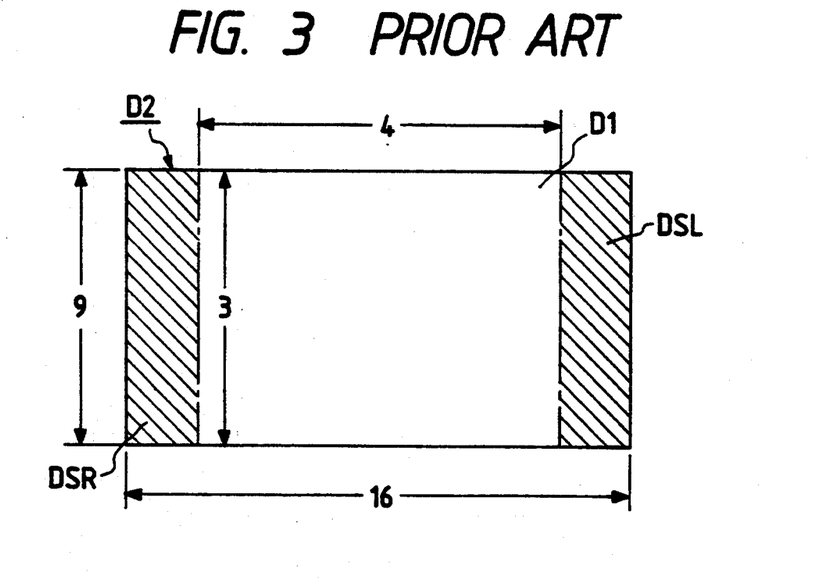
FIG. 3 is another schematic representation of aspect ratios of reproduced television pictures.

In the signal mixing circuit 39, the FM luminance signal Yf and the down-converted chrominance signal Cc are combined by frequency-multiplexing to produce a first recording video signal Sm which represents images in a picture area D1 having an aspect ratio of 3:4, as shown in FIG. 3. This first recording video signal Sm is supplied through a recording amplifier 43 to a rotary magnetic head 45 and recorded on a magnetic tape TP in a plurality of slant tracks. Preferably, one field period of the video signal of the 3:4 aspect ratio is recorded in each slant track. At this time, the high definition signal processing circuit 35, even though supplied with the luminance signal Y1, the color difference signal (R−Y)1 and the color difference signal (B−Y)1 by the switches 27, 29 and 31, respectively, does not produce an output signal.

Figure 4:
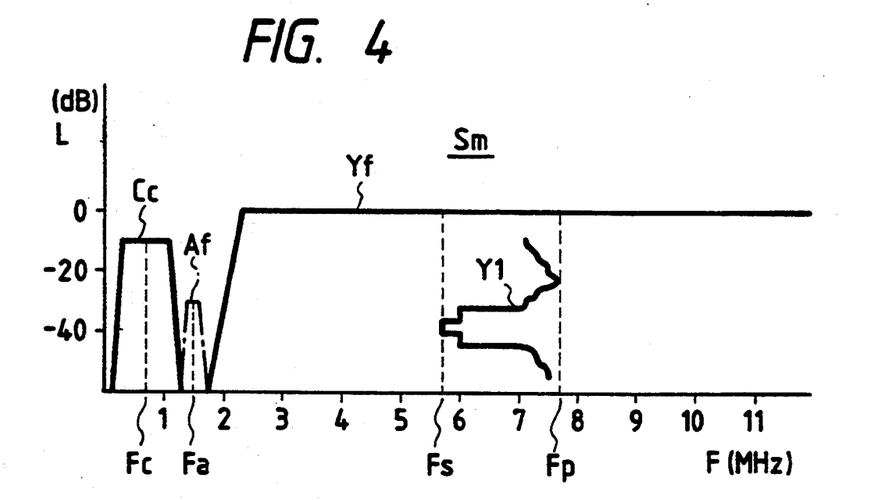
FIG. 4 is a graphical representation of the frequency spectrum of a video signal recorded on a magnetic tape.

As shown in the frequency spectrum of FIG. 4, whose abscissa represents frequency F and whose ordinate represents signal level L, the FM luminance signal Yf of the first recording video signal Sm has frequency-deviations between frequency Fs and frequency Fp and the down-converted chrominance signal Cc of the recording video signal Sm has a carrier frequency Fc and is allocated to a frequency band lower than the frequency band of the FM luminance signal Yf. A frequency-modulated audio signal Af having a center frequency Fa may be allocated to a relatively narrow band between the frequency band of the down-converted chrominance signal Cc and the frequency band of the FM luminance signal Yf, as shown by the dot-dash line, in FIG. 4. The frequency spectrum shown in FIG. 4 is substantially identical to that of a signal recorded in the well known format.

Now, let it be assumed that the aspect ratio changing signal Cs from the control signal generator 21 exhibits its high level and therefore the luminance signal Y2, the color difference signal (R−Y)2 and the color difference signal (B−Y)2 are passed by the switches 27, 29 and 31, respectively. An FM luminance signal Yf is produced by the luminance signal processing circuit 33 from a part of the luminance signal Y2, but does not include a high frequency component (for example, because of low pass filtering). This FM luminance signal Yf is supplied to the signal mixing circuit 39. Likewise, a chrominance signal C2 is produced by the encoder 37 from a part of each of the color difference signals (R−Y)2 and (B−Y)2 and is supplied to the chrominance signal processing circuit 41 which, in turn, produces a down-converted chrominance signal Cs that is supplied to the signal mixing circuit 39.

Like before, the signal mixing circuit 39 combines the FM luminance signal Yf and the down-converted chrominance signal Cc by frequency-multiplexing to produce a recording video signal Sm which is substantially similar to the aforedescribed first recording video signal Sm and represents those images in picture area D1 having the aspect ratio of 3:4 shown in FIG. 3. This recording video signal Sm is supplied through a recording amplifier 43 to magnetic head 45 and recorded in a plurality of slant tracks on magnetic tape TP as before.

In the present case, however, the luminance signal Y2 and the color difference signals (R−Y)2 and (B−Y)2 are derived from images with the aspect ratio 9:16. Accordingly, an additional recording video signal Sma is formed by frequency-multiplexing an additional FM luminance signal and an additional frequency-converted chrominance signal. The additional FM luminance signal is produced from that portion of the luminance signal Y2 that represents those images in a pair of side panels DSL and DSR located at the outside of the picture area D1 but inside the picture area D2 having the aspect ratio 9:16 as shown cross-hatched in FIG. 3; plus the high frequency component of the luminance signal Y2 (as may be attained by gating and high pass filtering). The frequency-converted chrominance signal is formed by frequency-converting those portions of each of the color difference signals (R−Y)2 and (B−Y)2 that represent the images in the side panels DSL and DSR shown in FIG. 3. This additional recording video signal Sma is produced by the high definition signal processing circuit 35. The additional recording video signal Sma thus obtained from the high definition signal processing circuit 35 and the first recording video signal Sm obtained from the signal mixing circuit collectively constitute a second recording video signal which represents the images in the picture area D2 having the aspect ratio of 9:16, as derived by the CCD image pickup element 11.

The additional recording video signal Sma obtained from the high definition signal processing circuit 35 is supplied through a recording amplifier 47 to a rotary magnetic head 49 and recorded on the magnetic tape TP in a plurality of slant tracks separated from the slant tracks formed by the rotary magnetic head 45. The slant tracks recorded by head 45 (in which the first recording video signal Sm is recorded) and the slant tracks recorded by head 49 (in which the additional recording video signal Sma is recorded) are positioned alternately on the magnetic tape TP, and the combined video signals recorded in such slant tracks represent the images in the picture area D2 having the aspect ratio of 9:16. It will be seen that one field interval of the additional recording video signal Sma is recorded in each slant track by head 49; and magnetic heads 45 and 49 have respective gap azimuth angles that differ from each other.

As described above, in the embodiment shown in FIG. 2, the first recording video signal Sm is produced from the video signal of the 3:4 aspect ratio formed of luminance signal Y1 and the color difference signals (R−Y)1 and (B−Y)1, which are derived from the first pickup output signal Q1 generated by the CCD image pickup element 11 representing images in the picture area D1 having the first aspect ratio of 3:4. The second recording video signal is composed of both the first recording video signal Sm and the additional recording video signal Sma, and both of these recording signals are produced from the video signal of the 9:16 aspect ratio formed of the luminance signal Y2 and the color difference signals (R−Y)2 and (B−Y)2, which are derived from the second pickup output signal Q2 generated by the CCD image picking element representing images in the picture area D2 having the second aspect ratio of 9:16. Thus, either the first recording video signal Sm produced from the video signal having the 3:4 aspect ratio or the second recording video signal (Sm+Sma) produced from the video signal having the 9:16 aspect ratio is properly recorded on the magnetic tape TP without frequency restraints or other restrictions.

In the embodiment shown in FIG. 2, the rotary magnetic head 49 is adapted to record a slant track alongside each slant track recorded by the rotary magnetic head 45. Alternatively, the rotary magnetic head 45 may be of the type adapted for vertical recording so that the first recording video signal Sm and the second recording video signal (Sm +Sma) are recorded at respective positions in the magnetic tape TP in the same slant track but at different depths in the tape.

Figure 5:
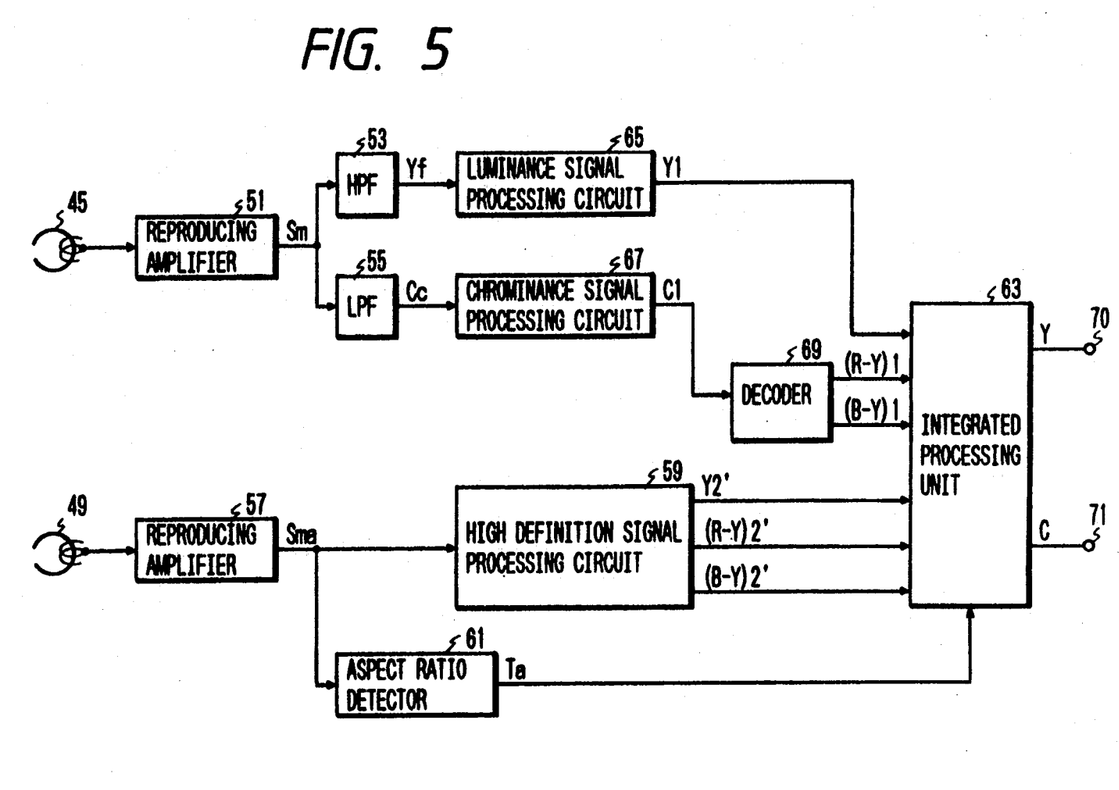
FIG. 5 is a block diagram of a reproducing system used for reproducing a video signal recorded by the first embodiment shown in FIG. 2.

FIG. 5 shows a reproducing system for recovering a luminance signal and a chrominance signal from a magnetic tape on which either the first recording video signal Sm produced from the video signal of the 3:4 aspect ratio or the second recording video signal produced from the video signal of the 9:16 aspect ratio has been recorded by the embodiment shown in FIG. 2.

Referring to FIG. 5, the rotary magnetic heads 45 and 49 which are provided in the embodiment shown in FIG. 2 may be used as reproducing magnetic heads. The rotary magnetic head 45 is adapted to scan each of the record tracks in which the first recording video signal Sm is recorded (produced either from the video signal of the 3:4 aspect ratio or from the video signal of the 9:16 aspect ratio) and the rotary magnetic head 49 is adapted to scan each of record tracks on the magnetic tape in which the additional recording video signal Sma is recorded.

The first recording video signal Sm read from the magnetic tape by the rotary magnetic head 45 is supplied through a reproducing amplifier 51 to a high pass filter (HPF) 53 and to a low pass filter (LPF) 55. The additional recording video signal Sma read from the magnetic tape by the rotary magnetic head 49 is supplied through a reproducing amplifier 57 to a high definition signal processing circuit 59 and to an aspect ratio detector 61.

If the first recording video signal produced from the video signal of the 3:4 aspect ratio is recorded on the magnetic tape, a read output signal is not obtained from the rotary magnetic head 49 and therefore no additional recording video signal Sma is supplied to the aspect ratio detector 61. Hence, a detection output signal Ta having a low level is produced by the aspect ratio detector 61 and supplied to an integrated processing unit 63. Of course, the first recording video signal Sm supplied to amplifier 51 results in coupling the FM luminance signal Yf from the high pass filter 53 to a luminance signal processing circuit 65 and in coupling the down-converted chrominance signal Cc from the low pass filter 55 to a chrominance signal processing circuit 67.

The luminance signal processing circuit 65 subjects the FM luminance signal Yf to various signal processing operations including frequency-demodulation to recover the luminance signal Y1 which is supplied to the integrated processing unit 63. The chrominance signal processing circuit 67 subjects the down-converted chrominance signal Cc to various signal processing operations including frequency-conversion to recover the chrominance signal Cl which is supplied to a decoder 69. The decoder is the complement of encoder 37 to produce the color difference signals (R−Y)1 and (B−Y)1 which are supplied to the integrated processing unit 63. The integrated processing unit 63 also is supplied with the detection output signal which, in the present example, exhibits a low level. Consequently, unit 63 couples the luminance signal Y1 to a luminance signal output terminal 70 as a reproduced luminance signal Y and combines the color difference signals (R−Y)1 and (B−Y)1 to produce the chrominance signal Cl which is coupled to a chrominance signal output terminal 71 as a reproduced chrominance signal C.

Now, let it be assumed that the second recording video signal produced from the video signal of the 9:16 aspect ratio is recorded on the magnetic tape. It is recalled that this second recording video signal is comprised of two portions Sm and Sma. The first portion, or first recording video signal Sm, is read by the rotary magnetic head 45 and the second portion, or additional recording video signal Sma, is read by the rotary magnetic head 49. The additional recording video signal Sma is supplied to the aspect ratio detector 61 which now generates a detection output signal Ta having a high level. Further, the additional recording video signal Sma is also supplied to the high definition signal processing circuit 59 which recovers a luminance signal Y2′ and color difference signals (R−Y)2′ and (B−Y)2′ from the additional recording video signals and supplies the recovered luminance and color difference signals to the integrated processing unit 63.

The portion Sm read by head 45 is coupled to high pass filter 53 which derives the FM luminance signal Yf therefrom and supplies same to the luminance signal processing circuit 65. Portion Sm also is coupled to low pass filter 55 which derives the down-converted chrominance signal Cc therefrom and supplies same to the chrominance signal processing circuit 67. The luminance signal processing circuit 65 subjects the FM luminance signal Yf to various signal processing operations including frequency-demodulation to recover the luminance signal Y1 which is supplied to the integrated processing unit 63. The chrominance signal processing circuit 67 subjects the down-converted chrominance signal Cc to various signal processing operations including frequency-conversion to recover the chrominance signal C1 which is supplied to the decoder 69. The decoder produces the color difference signals (R−Y)1 and (B−Y)1 from the recovered chrominance signal and supplies these color difference signals to the integrated processing unit 63.

The integrated processing unit 63, to which the detection output signal Ta now having the high level is supplied, operates to combine the luminance signal Y2′0 from the high definition signal processing circuit 59 with the luminance signal Y1 from the luminance signal processing circuit 65 to produce the reproduced luminance signal Y which is coupled to the luminance signal output terminal 70. The integrated processing unit further operates to reproduce the chrominance signal C from the color difference signals (R−Y)2′, (B−Y)2′, (R−Y)1 and (B−Y)1 and to couple the reproduced chrominance signal C to the chrominance signal output terminal 71.

In the reproducing system shown in FIG. 5, the first recording video signal Sm, which is produced from the first pickup output signal Q1 representing images in the picture area D1 having the aspect ratio of 3:4, is read by the rotary magnetic head 45 and processed to produce the reproduced luminance signal Y and the reproduced chrominance signal C both when the first recording video signal Sm is produced from the video signal of the 3:4 aspect ratio and when the second recording video signal is produced from the video signal of the 9:16 aspect ratio.

Thus, if a video monitor having a display screen with the aspect ratio of 3:4 is used for displaying a picture recovered from the reproduced luminance and chrominance signals Y and C provided at output terminals 70 and 71 when the second recording video signal produced from the video signal of the 9:16 aspect ratio had been recorded on the magnetic tape, the picture is satisfactorily displayed with the aspect ratio of 3:4 on the display screen. Conversely, if a video monitor having a display screen with the aspect ratio of 9:16 is used for displaying a picture recovered from the reproduced luminance and chrominance signals Y and C provided at output terminal 70 and 71 when the first recording video signal Sm produced from the video signal of the 3:4 aspect ratio had been recorded on the magnetic tape, the picture is satisfactorily displayed with the aspect ratio of 3:4 on the display screen.

Figure 6:
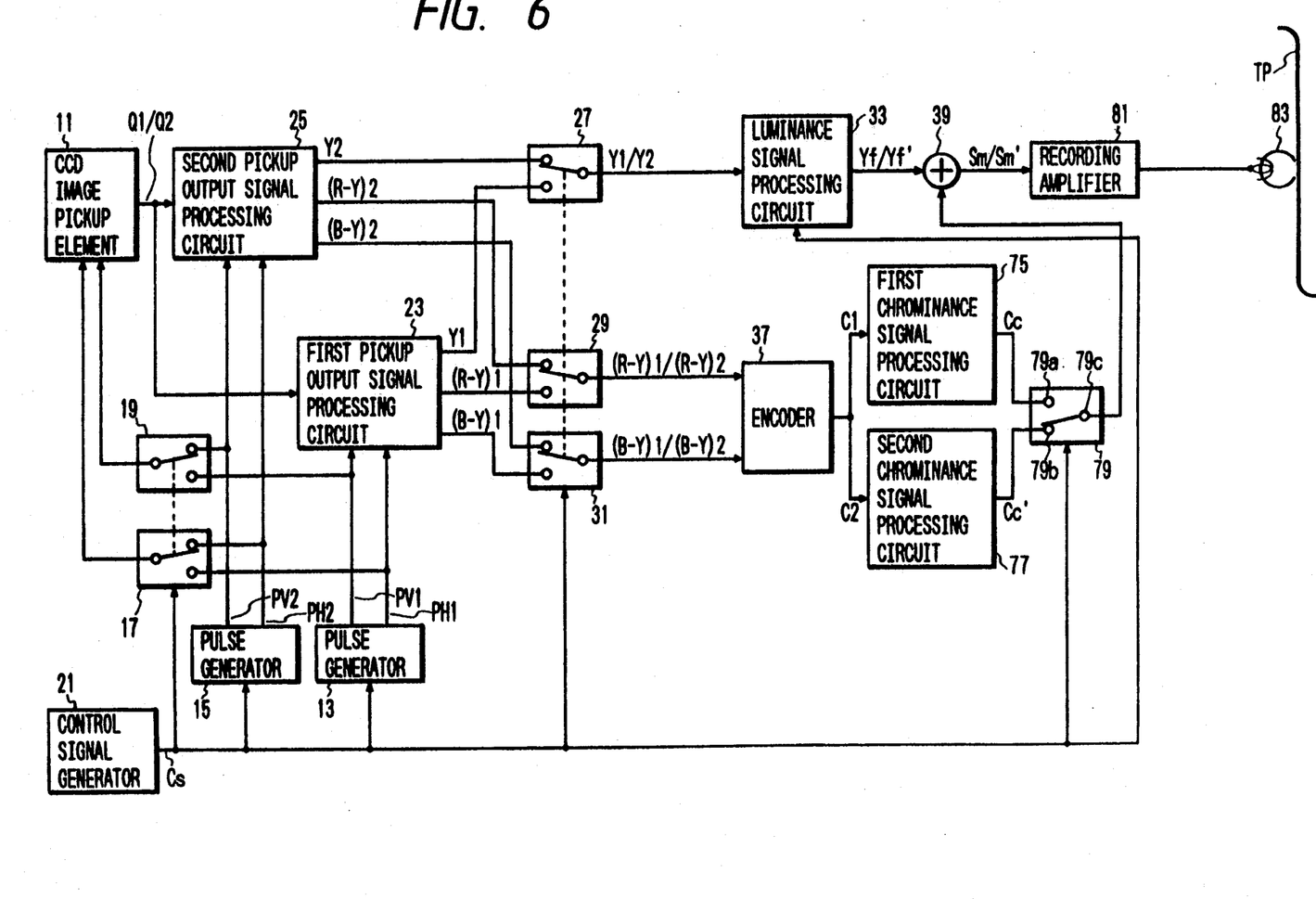
FIG. 6 is a block diagram of a second embodiment of video signal producing and recording apparatus according to the present invention.

FIG. 6 shows a second embodiment of apparatus for producing and recording a video signal according to the present invention wherein blocks and portions corresponding to those of FIG. 2 are identified with the same reference numerals and further description thereof will be omitted.

Referring to FIG. 6, a luminance signal processing circuit 33 to which the luminance signal Y1 or Y2 having been passed by a switch 27 is supplied also receives the aspect ratio changing signal Cs from control signal generator 21. The luminance signal processing circuit 33 responds to a low level aspect ratio changing signal to process the luminance signal Y1 to produce an FM luminance signal Yf having frequency deviations between frequency Fs and frequency Fp, as shown in FIG. 4. When the aspect ratio changing signal Cs exhibits a high level, the luminance signal processing circuit processes the luminance signal Y2 to produce an FM luminance signal Yf′ allocated to a frequency band that is higher than the frequency band of the FM luminance signal Yf and having frequency deviations between frequency Fs′ and frequency Fp′ as graphically shown in the frequency spectrum of FIG. 7. Here, the abscissa represents frequency F and the ordinate represents signal level L, when the aspect ratio changing signal Cs is at high level.

Further, in the embodiment shown in FIG. 6, the high definition signal processing circuit 35 employed in the embodiment shown in FIG. 2 is omitted. In place thereof are first and second chrominance signal processing circuits 75 and 77, to which is supplied a chrominance signal C1 or C2 obtained from encoder 37, and a switch 79 which is responsive to the aspect ratio changing signal Cs to couple the output of the first or second chrominance signal processing circuits to the mixing circuit 39.

When the aspect ratio changing signal Cs from the control signal generator 21 is at its low level, the luminance signal Y1, the color difference signal (R−Y)1 and the color difference signal (B−Y)1 are selected by the switches 27, 29 and 31, respectively. The FM luminance signal Yf produced from the luminance signal Y1 and exhibiting frequency deviations between frequency Fs and frequency Fp is supplied from the luminance signal processing circuit 33 to signal mixing circuit 39. A down-converted chrominance signal produced from the chrominance signal C1 that is derived by the encoder 37 from the color difference signals (R−Y)1 and (B−Y)1 and having a center frequency Fc (as shown in FIG. 4) is supplied from the first chrominance signal processing circuit 75 to a contact 79a of the switch 79. The switch 79 is controlled by the aspect ratio changing signal Cs such that when this signal Cs has a low level, a movable contact 79c is connected to the contact 79a to couple the down-converted chrominance signal Cc from the first chrominance signal processing circuit 75 to the signal mixing circuit 39.

The signal mixing circuit 39 combines the FM luminance signal Yf and the down-converted chrominance signal Cc by frequency-multiplexing to produce a first recording video signal Sm which represents images formed in the CCD image pickup element 11 in a picture area D1 having the aspect ratio of 3:4, as shown in FIG. 3. This first recording video signal Sm is supplied through a recording amplifier 81 to a rotary magnetic head 83 and recorded in a plurality of slant tracks on the magnetic tape TP. The rotary magnetic head records one field period of the recording video signal in each slant track.

Figure 7:
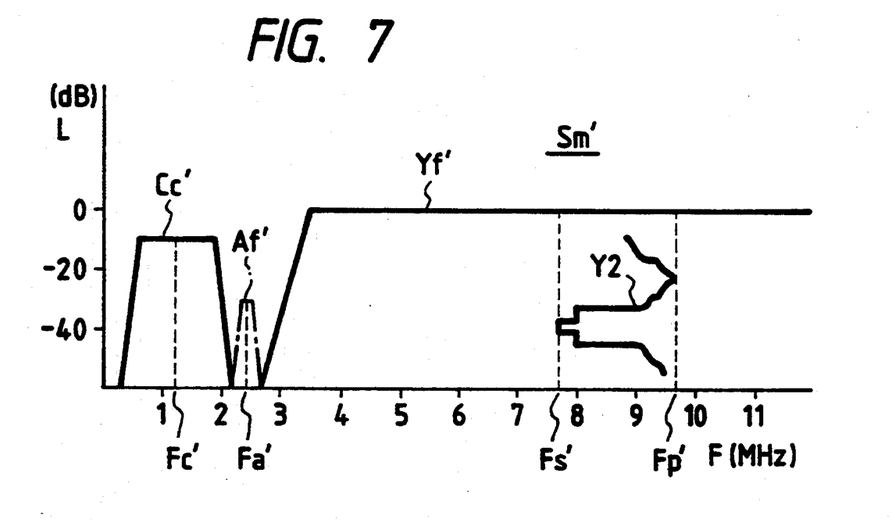
FIG. 7 is a graphical representation of the frequency spectrum of a video signal recorded on a magnetic tape by the apparatus of FIG. 6.

Now, when the aspect ratio changing signal Cs from the control signal generator 21 is at its high level, the luminance signal Y2, the color difference signal (R−Y)2 and the color difference signal (B−Y)2 are selected by the switches 27, 29 and 31, respectively. The FM luminance signal Yf' produced from the luminance signal Y2 and exhibiting frequency deviations between frequency Fs' and frequency Fp' is supplied from the luminance signal processing circuit 33 to the signal mixing circuit 39. A down-converted chrominance signal Cc', produced from the chrominance signal C2 that is derived by the encoder 37 from the color difference signals (R−Y)2 and (B−Y)2 and having a carrier frequency Fc' higher than the carrier frequency Fc of the down-converted chrominance signal Cc and occupying a frequency bandwidth that is broader than that of the down-converted chrominance signal Cc, as shown in FIG. 7, is supplied from the second chrominance signal processing circuit 77 to a contact 79b of the switch 79. The switch 79 now responds to the high level of the aspect ratio changing signal Cs to connect the movable contact 79c to the contact 79b and therefore couples the down-converted chrominance signal Cc' from the second chrominance signal processing circuit 77 to the signal mixing circuit 39.

The signal mixing circuit 39, combines the FM luminance signal Yf' (which has an upwardly shifted frequency band as compared to that of the FM luminance signal Yf) and the down-converted chrominance signal Cc' (which has both a broader and an upwardly shifted frequency band as compared to that of the down-converted chrominance signal Cc) by frequency-multiplexing to produce a second recording video signal Sm'. This video signal Sm' represents images in a picture area D2 having the aspect ratio of 9:16, as shown in FIG. 3. The second recording video signal Sm' is supplied through the recording amplifier 81 to the rotary magnetic head 83 and recorded in a plurality of slant tracks on the magnetic tape TP such that one field period of the video signal is recorded in each slant track.

As in the FIG. 2 embodiment, a frequency-modulated audio signal Af' having a center frequency Fa' may be allocated to a relatively narrow space between the frequency band of the down-converted chrominance signal Cc' and the frequency band of the FM luminance signal Yf', as shown by the dot-dash line in FIG. 7

As described above, in the embodiment shown in FIG. 6, the first recording video signal Sm is produced from the video signal of the 3:4 aspect ratio which, in turn, is constituted by the luminance signal Y1 and the color difference signals (R−Y)1 and (B−Y)1 derived from the first pickup output signal Q1 which represents images in the picture area formed in the CCD image pickup element 11 having the aspect ratio 3:4. The second recording video signal Sm', which is comprised of the first recording video signal Sm and the additional recording video signal Sma, is produced from the video signal of the 9:16 aspect ratio which, in turn, is constituted by the luminance signal Y2 and the color difference signals (R−Y)2 and (B−Y)2 derived from the second pickup output signal Q2 that represents images in the picture area having the aspect ratio of 9:16. Either the first recording video signal Sm produced from the video signal of the 3:4 aspect ratio or the second recording video signal Sm' produced from the video signal of the 9:16 aspect ratio is satisfactorily recorded on the magnetic tape TP without frequency restraints or other restrictions.

Figure 8:
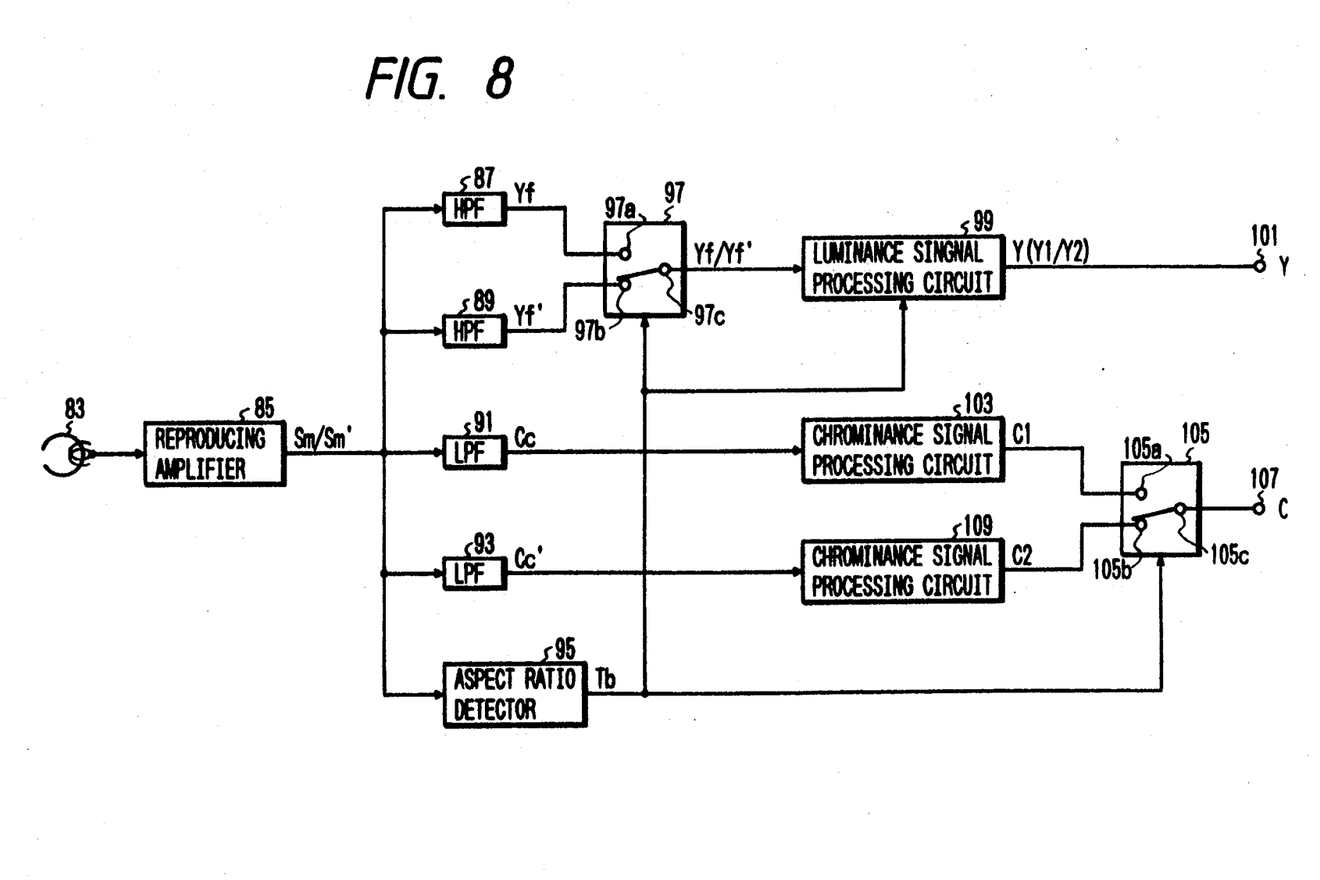
FIG. 8 is a block diagram of a reproducing system used for reproducing a video signal recorded by the second embodiment shown in FIG. 6.

FIG. 8 shows a reproducing system for recovering a luminance signal and a chrominance signal from a magnetic tape on which either the first recording video signal Sm produced from the video signal of the 3:4 aspect ratio or the second recording video signal Sm' produced from the video signal of the 9:16 aspect ratio has been recorded by the embodiment shown in FIG. 6.

Referring to FIG. 8, the rotary magnetic head 83 which is provided in the embodiment shown in FIG. 6 may be used as a reproducing magnetic head. The rotary magnetic head 83 is adapted to scan each of the record tracks in which the first recording video signal Sm or the second recording video signal Sm' is recorded.

The first recording video signal Sm or second recording video signal Sm' read from the magnetic tape by the rotary magnetic head 83 is supplied through a reproducing amplifier 85 to a high pass filter 87 adapted to pass the Fm luminance signal Yf, a high pass filter 89 adapted to pass the Fm luminance signal Yf', a low pass filter 91 adapted to pass the down-converted chrominance signal Cc, a low pass filter 93 adapted to pass the down-converted chrominance signal Cc', and an aspect ratio detector 95.

If the first recording video signal Sm is reproduced by the rotary magnetic head 83, a detection output signal Tb having a low level is produced by the aspect ratio detector 95. In addition, the FM luminance signal Yf recovered from the first recording video signal is coupled from the high pass filter 87 to a contact 97a of a switch 97 which responds to the low level detection output signal Tb to connect movable contact 97c to contact 97a and thereby couples the FM luminance signal Yf to a luminance signal processing circuit 99. The luminance signal processing circuit 99 subjects the FM luminance signal Yf to various signal processing operations including frequency-demodulation, and responds to the detection output signal Tb having a low level to reproduce the luminance signal Y1 which is supplied to a luminance signal output terminal 101 as the reproduced luminance signal Y.

The down-converted chrominance signal Cc recovered from the first recording video signal is coupled from the low pass filter 91 to a chrominance signal processing circuit 103 in which it is subjected to various signal processing operations including frequency-conversion to reproduce the chrominance signal C1. This chrominance signal C1 is supplied to a contact 105a of a switch 105 which responds to the low level detection output signal Tb from the aspect ratio detector 95 to connect a movable contact 105c to the contact 105a and thereby supplies the chrominance signal C1 to a chrominance signal output terminal 107 as the reproduced chrominance signal C.

Now, when the second recording video signal Sm' is reproduced by the rotary magnetic head 83, the detection output signal Tb produced by the aspect ratio detector 95 has a high level. In addition, the FM luminance signal Yf' recovered from the second recording video signal is coupled from the high pass filter 89 to a contact 97b of the switch 97 which responds to the high level detection output signal Tb to couple the movable contact 97c to contact 97b and thereby supply the FM luminance signal Yf' to the luminance signal processing circuit 99. The luminance signal processing circuit 99 subjects the FM luminance signal Yf' to various signal processing operations including frequency-demodulation and responds to the detection output signal Tb having a high level to reproduce the luminance signal Y2 which is supplied to the luminance signal output terminal 101 as the reproduced luminance signal Y.

The down-converted chrominance signal Cc' recovered from the second recording video signal is coupled from the low pass filter 93 to the chrominance signal processing circuit 109 in which it is subjected to various signal processing operations including frequency-conversion to reproduce the chrominance signal C2. This chrominance signal C2 is supplied to a contact 105b of the switch 105 which responds to the high level detection output signal Tb to couple the movable contact 105c to the contact 105b and thereby supplies the chrominance signal C2 to the chrominance signal output terminal 107 as the reproduced chrominance signal C.

Figure 9:
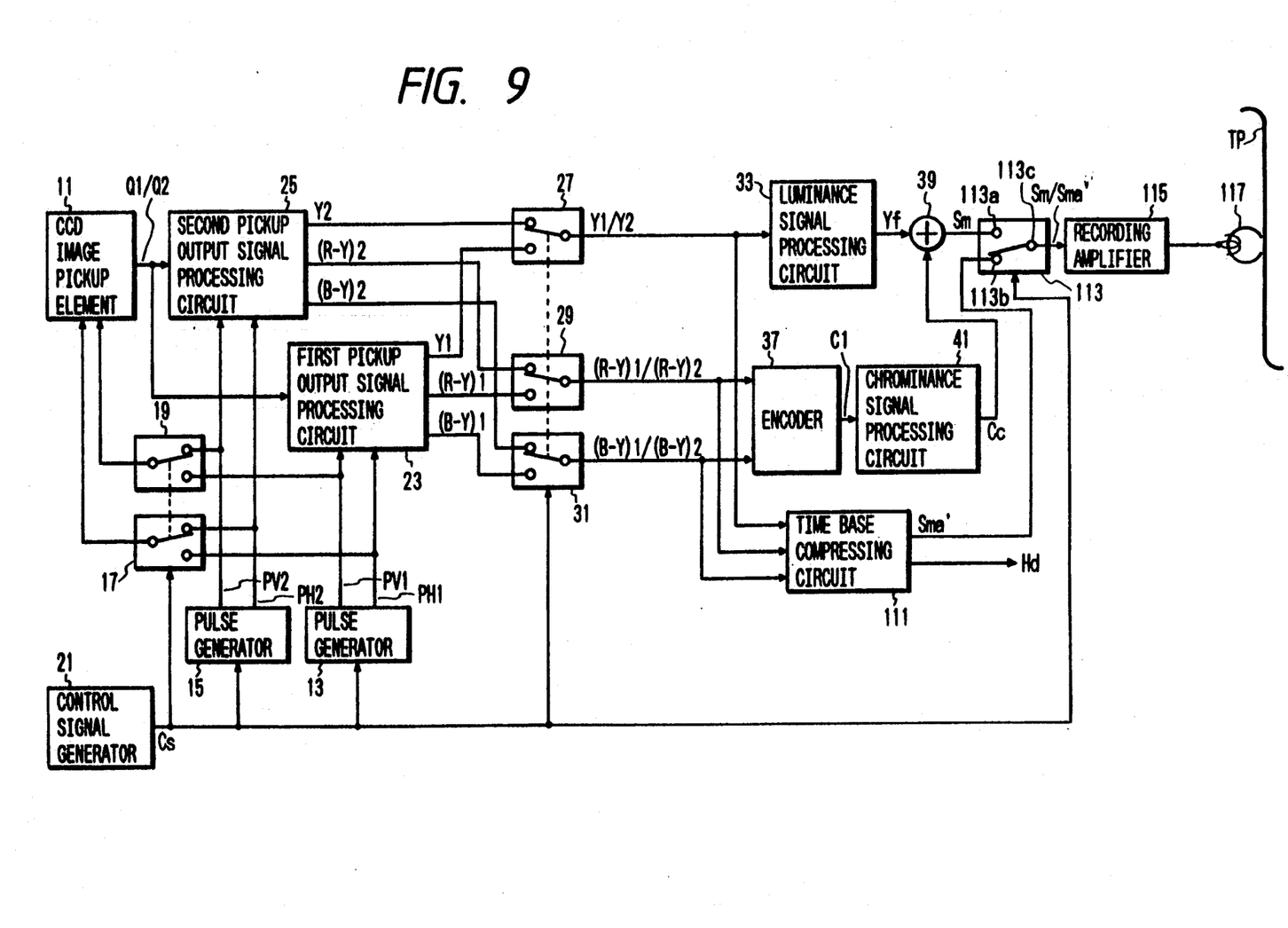
FIG. 9 is a block diagram of a third embodiment of video signal producing and recording apparatus according to the present invention.

FIG. 9 shows a third embodiment of apparatus for producing and recording a video signal according to the present invention wherein blocks and portions corresponding to those of FIG. 2 are identified with the same reference numerals and further description thereof will be omitted.

Referring to FIG. 9, a time base compressing circuit 111 is provided in place of the high definition signal processing circuit 35 employed in the embodiment shown in FIG. 2. The luminance signal Y1 or Y2 from switch 27, the color difference signal (R−Y)1 or (R−Y)2 from switch 29, and the color difference signal (B−Y)1 or (B−Y)2 from switch 31 are supplied to the time base compressing circuit 111. Further, a switch 113 responds to the aspect ratio changing signal Cs supplied from control signal generator 21 to select the output of signal mixing circuit 39 or the output of time base compressing circuit 111 to be coupled to recording amplifier 115, depending upon whether the aspect ratio changing signal Cs is of a high or low level.

If the aspect ratio changing signal Cs has a low level, the luminance signal Y1, the color difference signal (R−Y)1 and the color difference signal (B−y)1 are selected by the switches 27, 29 and 31, respectively, whereby signal mixing circuit 39 produces the first recording video signal Sm which represents images formed in the CCD image pickup element 11 in a picture area D1 having the aspect ratio of 3:4, as shown in FIG. 3, in the same manner as the embodiment shown in FIG. 2. This first recording video signal Sm is supplied to a contact 113a of the switch 113 which responds to the low level aspect ratio changing signal Cs to connect a movable contact 113c to contact 113a and thereby supplies the first recording video signal Sm to recording amplifier 115 and thence to a rotary magnetic head 117 for recording on a magnetic tape TP in a plurality of slant tracks. The rotary magnetic head 117 records one field period of the recording video signal in each slant rack.

It is seen that the output of the time base compressing circuit 111 is prevented by the switch 113 from being transmitted to the recording amplifier 115.

Now, when the aspect ratio changing signal Cs from the control signal generator 21 is at its high level, the luminance signal Y2, the color difference signal (R−Y)2 and the color difference signal (B−Y)2 are selected by the switches 27, 29 and 31, respectively. A second recording video signal Sma′ is produced by the time base compressing circuit 111 from the luminance signal Y2 and the color difference signals (R−Y)2 and (B−Y)2. The second recording video signal Sma′ contains a time base-compressed segment of the luminance signal Y2, a time base-compressed segment of the color difference signal (R−Y)2 and a time base-compressed segment of the color difference signal (B−Y)2 arranged in sequence in each horizontal period.

The second recording video signal Sma′ thus formed as a time base-compressed signal is supplied from the time base compressing circuit 111 to a contact 113b of the switch 113 which responds to the aspect ratio changing signal Cs which now is at its high level to connect the movable contact 113c to contact 113b and thereby supplies the second recording video signal Sma′ through the recording amplifier 115 to the rotary magnetic head 117.

Further, the time base compressing circuit 111 is adapted to supply a head speed control signal Hd to the rotary head drive motor in order to increase the speed of rotation of the rotary magnetic head 117 by a factor of two when the second recording video signal Sma′ is supplied to the rotary magnetic head. Accordingly, the second recording video signal Sma′ is recorded on the magnetic tape TP by the rotary magnetic head 117 which rotates at twice its normal speed, thereby forming twice the number of slant tracks compared with the slant tracks formed on the magnetic tape TP when the first recording video signal Sm is recorded. Hence, one field period of the second recording video signal Sma′ is recorded in two adjacent slant tracks.

Figure 10:
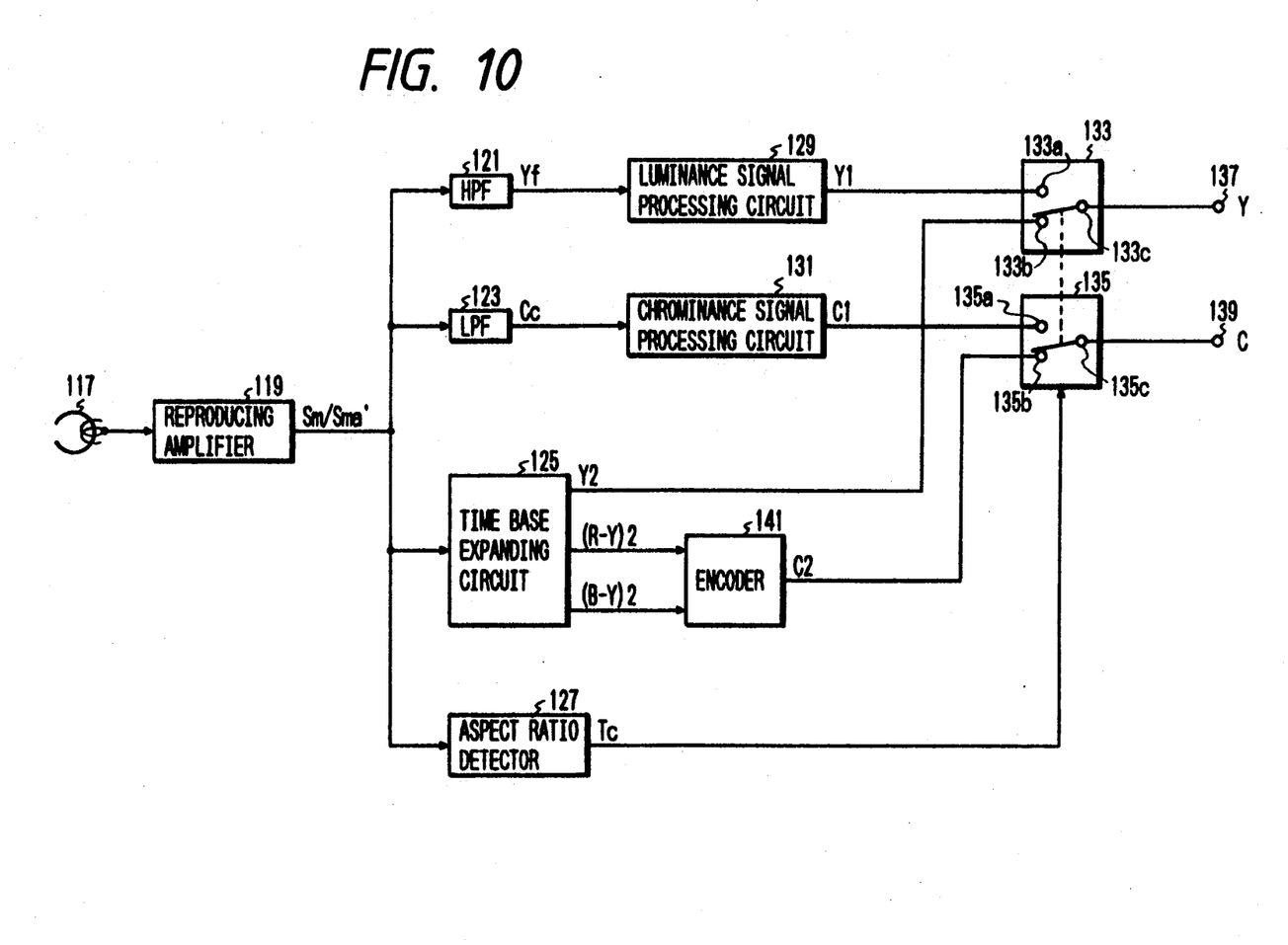
FIG. 10 is a block diagram of a reproducing system used for reproducing a video signal recorded by the third embodiment shown in FIG. 9.

FIG. 10 shows a reproducing system for recovering a luminance signal and a chrominance signal from a magnetic tape on which either the first recording video signal Sm produced from the video signal of the 3:4 aspect ratio or the second recording video signal Sma′ produced from the video signal of the 9:16 aspect ratio has been recorded by the embodiment shown in FIG. 9.

Referring to FIG. 10, the rotary magnetic head 117 which is provided in the embodiment shown in FIG. 9 may be used as a reproducing magnetic head. The rotary magnetic head 117 is adapted to scan each of the record tracks in which the first recording video signal Sma′ is recorded. When the slant tracks containing the second recording video signal Sma′ are scanned, the rotary magnetic head 117 is driven to rotate at twice the speed otherwise used for scanning the slant tracks in which the first recording video signal Sm is recorded.

The first recording video signal Sm or second recording video signal Sma′ read from the magnetic tape by the rotary magnetic head 117 is supplied through a reproducing amplifier 119 to a high pass filter 121 adapted to pass the FM luminance signal Yf, a low pass filter 123 adapted to pass the down-converted chrominance signal Cc, a time base expanding circuit 125, and an aspect ratio detector 127.

If the first recording video signal Sm is reproduced by the rotary magnetic head 117, a detection output signal Tc having a low level is produced by the aspect ratio detector 127 in response thereto. In addition, the FM luminance signal Yf recovered from the first recording video signal is coupled from the high pass filter 121 to a luminance signal processing circuit 129 and the down-converted chromiance signal Cc recovered from the first recording video signal is coupled from the low pass filter 123 to a chrominance signal processing circuit 131. The luminance signal processing circuit 129 subjects the FM luminance signal Yf to various signal processing operations including frequency-demodulation which reproduces the luminance signal Y1 and supplies same to a contact 133a of a switch 133. The chrominance signal processing circuit 131 subjects the down-converted chrominance signal Cc to various signal processing operations including frequency-conversion which reproduces the chrominance signal C1 and supplies same to a contact 135a of a switch 135.

The switch 133 receives the detection output signal Tc from the aspect ratio detector 127 and responds to a low level detection output signal to connect a movable contact 133c to the contact 133a and thereby couples the luminance signal Y1 reproduced by the luminance signal processing circuit 129 to a luminance signal output terminal 137 as the reproduced luminance signal Y. Similarly, the switch 135 receives the detection output signal Tc from the aspect ratio detector 127 and responds to a low level detection output signal Tc to connect a movable contact 135c to the contact 135a and thereby couples the chrominance signal C1 reproduced by the chrominance signal processing circuit 131 to a chrominance signal output terminal 139 as the reproduced chrominance signal C.

When the second recording video signal Sma' is reproduced by the rotary magnetic head 117, the detection output signal Tc having a high level is produced by the aspect ratio detector 127 in response thereto. In addition, the time base expanding circuit 125 subjects the second recording video signal Sma' to various signal processing operations including time base-expansion by which the luminance signal Y2 and the color difference signals (R−Y)2 and (B−Y)2 are recovered. The luminance signal Y2 is supplied from the time base expanding circuit 125 to a contact 133b of the switch 133 and the color difference signals (R−Y)2 and (B−Y)2 are supplied from the time base expanding circuit to an encoder 141. The encoder 141 produces the chrominance signal C2 from the color difference signals (R−Y)2 and (B−Y)2 and supplies the chrominance signal to a contact 135b of the switch 135.

The switch 133 responds to the high level detection output signal Tc to connect the movable contact 133c to the contact 133b and thereby couples the luminance signal Y2 recovered by the time base expanding circuit 125 to the luminance signal output terminal 137 as the reproduced luminance signal Y. Similarly, the switch 135 responds to the high level detection output signal Tc to connect the movable contact 135c to the contact 135b and thereby couples the chrominance signal C2 produced by the encoder 141 to the chrominance signal output terminal 139 as the reproduced chrominance signal C.

What is claimed is:

1. Apparatus for producing and recording a video signal comprising:
   image pickup means for picking up images in a picture area having one of first and second aspect ratios and driving means for driving said image pickup means with first and second sets of horizontal and vertical drive pulses for selectively supplying a first pickup output signal representing images in the picture area of the first aspect ratio or a second pickup output signal representing images in the picture area of the second aspect ratio,
   signal processing means having a first condition for processing the first pickup signal to produce a first video signal for recording and a second condition for processing the second pickup output signal to produce a second video signal for recording,
   recording means for recording on a record medium the first or second video signal produced by said signal processing means, said recording means comprising a first recording head for recording all of the first video signal when said signal processing means is placed in said first condition and a first portion of said second video signal representing substantially the same video information as said first video signal when said signal processing means is placed in said second condition, and a second recording head for recording a second portion of said second video signal representing video information other than that represented by said first portion, and
   operation control means coupled to said image pickup means for selectively controlling said image pickup means to supply the first pickup output signal and for placing said signal processing means in said first condition to process said first pickup output signal when said image pickup means supplies said first pickup output signal, said operation control means also selectively controlling said image pickup means to supply the second pickup output signal and placing said signal processing means in said second condition to process said second pickup output signal when said image pickup means supplies said second pickup output signal.

2. Apparatus according to claim 1, wherein said first aspect ratio is 3:4 and said second aspect ratio is 9:16.

3. Apparatus according to claim 1, wherein said first and second recording heads comprise a pair of rotary magnetic heads having respective gap azimuth angles different from each other to form respective record tracks adjacent each other on a magnetic tape.

4. Apparatus according to claim 1, wherein said signal processing means comprises first circuit means for producing from said first pickup output signal said first video signal and second circuit means for producing from said second pickup output signal said second video signal having a frequency bandwidth broader than the frequency bandwidth of said first video signal.

5. Apparatus according to claim 1, wherein said signal processing means includes means for producing luminance and chrominance signal components form at least said second pickup output signal, and time base compressing means for time base compressing said luminance and chrominance signal components produced from said second pickup output signal to thereby produce said second video signal.

6. Apparatus according to claim 5, wherein said recording means further comprises means for driving said recording heads to record said second video signal at a speed twice that for recording said first video signal.

7. Apparatus according to claim 6, wherein said recording head is driven to record one field period of said second video signal in two adjacent record tracks on the recording medium.

8. Apparatus according to claim 4 further comprising signal reading means for reading from said record medium one of said first and second video signals recorded by said recording means, signal reproducing means having a first reproducing condition for producing a reproduced signal output form the video signal read from said record medium and a second reproducing condition for producing a reproduced signal output from the second video signal read from said record medium, aspect ratio detecting means for detecting said first or second aspect ratios in response to the first or second video signal read by said signal reading means, and additional operation control means responsive to said aspect ratio detecting means for disposing said signal reproducing means in said first reproducing condition when said first video signal is read from said record medium and in said second reproducing condition when said second video signal is read from said record medium. first and second video signals recorded by said recording means, signal reproducing means having a first reproducing condition for producing a reproduced signal output form the first video signal read from said record medium and a second reproducing condition for producing a reproduced signal output from the second video signal read from said record medium, aspect ratio detecting means for detecting said first or second aspect ratios in response to the first or second video signal read by said signal reading means, and additional operation control means responsive to said aspect ratio detecting means for disposing said signal reproducing means in said first reproducing condition when said first video signal is read from said record medium and in said second reproducing condition when said second video signal is read from said record medium.

* * * * *